(12) United States Patent
Sella

(10) Patent No.: US 9,774,706 B2
(45) Date of Patent: Sep. 26, 2017

(54) PROVIDING FUNCTIONAL REQUIREMENTS FOR A NETWORK CONNECTION FROM A LOCAL LIBRARY

(71) Applicant: Level 3 Communications, LLC, Broomfield, CO (US)

(72) Inventor: William Thomas Sella, Parker, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 265 days.

(21) Appl. No.: 14/678,682

(22) Filed: Apr. 3, 2015

(65) Prior Publication Data

US 2016/0094445 A1 Mar. 31, 2016

Related U.S. Application Data

(60) Provisional application No. 62/057,756, filed on Sep. 30, 2014.

(51) Int. Cl.
| | |
|---|---|
| *H04L 29/06* | (2006.01) |
| *H04L 29/08* | (2006.01) |
| *H04W 36/14* | (2009.01) |
| *H04L 12/701* | (2013.01) |

(52) U.S. Cl.
CPC ............ *H04L 69/16* (2013.01); *H04L 67/34* (2013.01); *H04L 45/00* (2013.01); *H04W 36/14* (2013.01)

(58) Field of Classification Search
CPC ..... H04L 69/16; H04L 67/34; H04L 67/1002; H04L 67/141; H04L 67/1014; H04L 65/1083; H04L 12/66; H04L 45/00; H04L 45/306; H04L 45/22; H04L 45/308; H04L 47/2441; H04L 47/805; H04L 5/0091; H04L 63/10; H04L 41/5025; H04W 48/18; H04W 76/02; H04W 24/04; H04W 28/12; H04W 36/14; H04W 36/0022; H04W 60/04; H04W 72/0406
See application file for complete search history.

(56) References Cited

U.S. PATENT DOCUMENTS

| | | | |
|---|---|---|---|
| 6,141,686 A | 10/2000 | Jackowski et al. | |
| 8,745,185 B1 * | 6/2014 | Salo | H04L 63/0428 709/223 |
| 2001/0029547 A1 * | 10/2001 | Kano | H04L 41/5054 709/238 |

(Continued)

OTHER PUBLICATIONS

International Search Report dated Dec. 11, 2015, Int'l Appl. No. PCT/US15/051524, In'tl Filing Date Sep. 22, 2015; 3 pgs.

(Continued)

*Primary Examiner* — Candal Elpenord
*Assistant Examiner* — Ricardo Castaneyra

(57) ABSTRACT

A network application may transmit data over a network connection. The application may require certain functionality for the network connection. An embodiment provides a method for the application to inform the network of its requirement. The application may use a control packet to inform the network of its functionality requirement for the connection it is using. The control packets may be sent to the network at the same time the application is transmitting its data. In an embodiment, a user using the application instructs the network to provide certain functionality using the control packet.

22 Claims, 7 Drawing Sheets

(56) References Cited

U.S. PATENT DOCUMENTS

| | | |
|---|---|---|
| 2003/0031192 A1 | 2/2003 | Furuno |
| 2006/0080673 A1 | 4/2006 | Allie et al. |
| 2010/0057932 A1 | 3/2010 | Pope et al. |
| 2010/0281162 A1 | 11/2010 | Venkatraman et al. |
| 2011/0264758 A1 | 10/2011 | Pope et al. |
| 2012/0014271 A1 | 1/2012 | Damenti |
| 2013/0166687 A1 | 6/2013 | Hirano |

OTHER PUBLICATIONS

Written Opinion of the International Searching Authority dated Dec. 11, 2015, Int'l Appl. No. PCT/US15/051524, In'tl Filing Date Sep. 22, 2015; 9 pgs.

International Preliminary Report on Patentability, dated Apr. 4, 2017, Int'l Appl. No. PCT/US15/051524, Int'l Filing Date Sep. 22, 2015; 11 pgs.

* cited by examiner

PROVIDING FUNCTIONAL REQUIREMENTS FOR A NETWORK CONNECTION FROM A LOCAL LIBRARY

BACKGROUND

Field

This field is generally related to communication networks.

Related Art

A communication network may, for example, provide a network connection that allows data to be transferred between two geographically remote locations. A network user may use the network connection to transfer data to or from a server on the network. In addition to merely transferring data, the network connection may provide other functionalities, perhaps to accommodate a particular level of service. For example, the network may provide certain bandwidth capacities or congestion control functions. Some functionality may be applied to alter the data transferred over the connection. For example, a Transport Control Protocol (TCP) proxy may be applied that conceals the source of TCP requests.

These functionalities may be specified by the user. In one example, the user may specify that the capacity allocated to the network connection change dynamically based on a criteria, such as a level of traffic load on the connection. To receive user requirements for network functionalities, some communication networks provide an Application Protocol Interface (API) for the user to enter the functionality requirements for its connection.

While using an API to input certain functionality requirements for a connection may inform the network of the user's requirements, having to use such APIs can be cumbersome for a user.

BRIEF SUMMARY

In an embodiment a computer-implemented method transmits user data over a communication network. The method includes receiving at a library integrated with a network stack, a specification of a network functionality requirement for a network connection. The network stack may initiate the network connection in response to a request by an application. In response to receipt of the specification of the network functionality requirement, the library may instruct the network stack to transmit a control packet. The network is configured, based on the control packet, to provide the network functionality requirement for the network connection.

System and computer program product embodiments are also disclosed.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Figure 1:
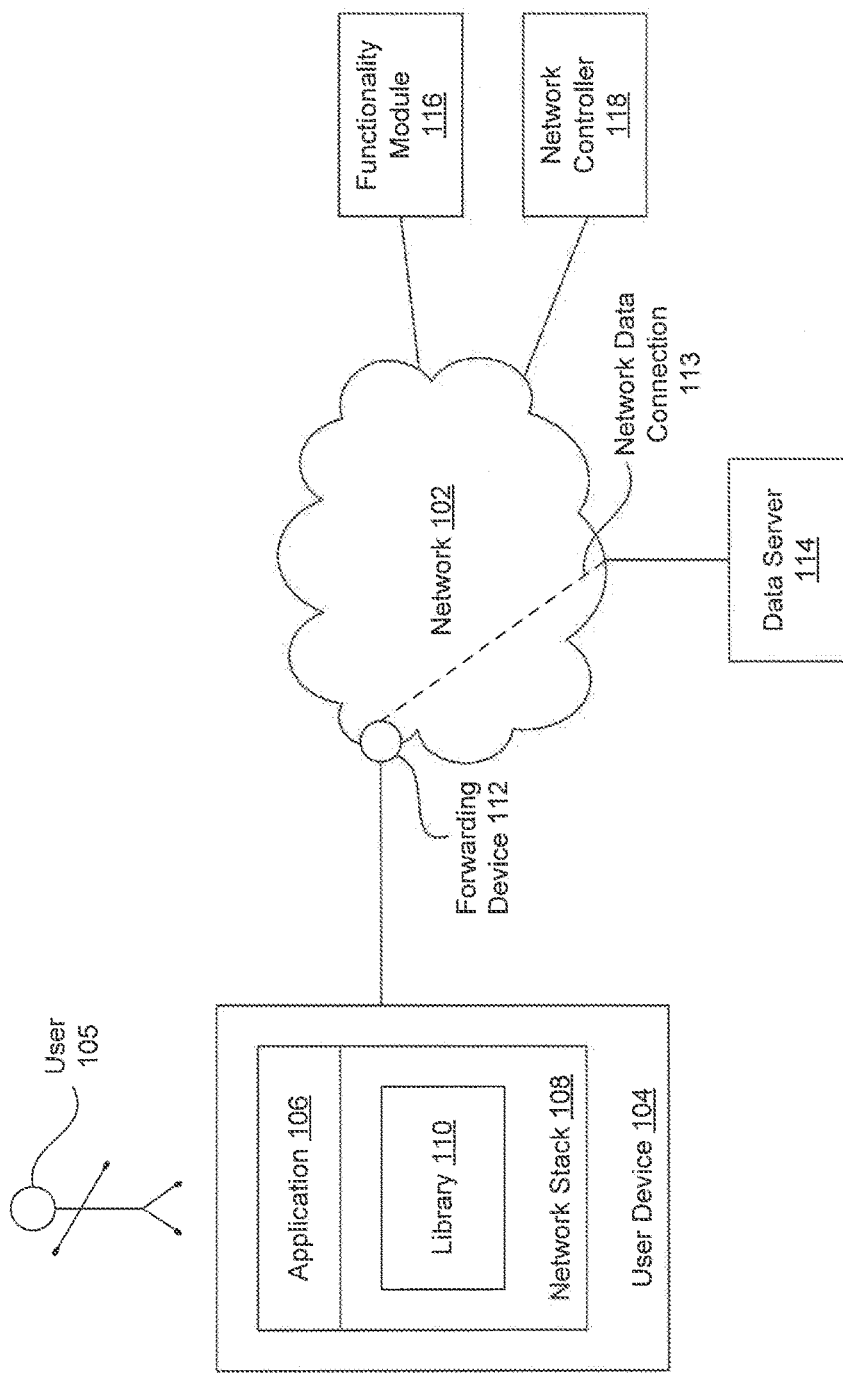
FIG. 1 is a diagram that illustrates a system for providing functionality requirement from a network stack for a network connection.

As mentioned above, configuring the network by a user through an API each time the user requires specific functionality for a network connection can cause overhead. A user may require multiple functionalities for an application. A user may also require different functionalities for different types of user applications that transmit data over the network.

To efficiently configure the network to provide the user's functionality requirement for the network connection, some embodiments disclosed here use a library installed in the user's computer, and in particular in the computer's network stack. The library sends a control packet to configure the network. A user, or a user application, may configure the library to provide specific functionalities for a network connection. After requesting the functionality, the library will generate the control packet to request functionality for the network connection, while the user application transmits application data over the network connection.

After receiving the control packet, a network controller makes necessary changes in the network to provide the required functionality or the network connection. For example if a user requires TCP proxy for a network connection, network controller may reroute the connection to a TCP proxy server.

In embodiments, the control packet contains information indicating the type of functionality required by the user. The network controller may use this information to provide the required functionality. The information in the control packet for example instructs the network controller to configure the network to provide TCP proxy or dynamic service level. A service level for a network connection may be, for example, bandwidth, latency, or jitter on the network connection.

A user may have multiple requirements for data generated by a particular application. Multiple applications may use a network connection, and each application may have a different set of requirements. In embodiments, the control packet generated from the user device will contain information indicating all the requirements of the user for the network connection.

Using the library to instruct the network stack to generate the control packets is an efficient way to provide user's functional requirements for the network connection. Using an API to configure a remote network controller can cause time and processing overhead. But by using a local library instead of using an API to configure a network controller, the user can more efficiently request its functional requirements for the network connection.

The Detailed Description that follows is divided into four sections. The first section describes, with respect to FIGS. 1-3, a system for providing a network functionality requirement for a network connection. The second section describes, with respect to FIG. 4, a method for providing the functionality requirement for a network connection using a control packet. The third section describes, with respect to FIGS. 4-6, configuring the network to provide a functionality requirement for a network connection. The fourth section describes, with respect to FIG. 7, periodically resending the control packet for configuring the network to provide functionality requirement for a connection.

System for Providing a Network Functionality Requirement for a Network Connection FIG. 1 illustrates a system 100 that includes a communication network 102. The communication network 102 may be a local area network (LAN), metropolitan area network (MAN), or wide area network (WAN). It may utilize any point-to-point or multipoint-to-multipoint networking protocols. The network access protocols used may include, for example, Multi Label Protocol Switching (MPLS), Ethernet, Asynchronous Transfer Mode (ATM), High-Level Data Link Control (HDLC), or Frame Relay.

Communication network 102 includes a plurality of forwarding devices, such as forwarding device 112, connected to a user device 104. Here, the term "forwarding device" refers to devices that switch or route packets, including devices at the data link layer (Open Systems Interconnection, OSI, layer 2) and the network layer (OSI layer 3). Forwarding device 112 may be connected to user device 104 via a direct link, or indirectly over a local network. User device 104 may establish a network connection 113 to a data server 114 and generate data traffic for transmitting over the network connection on communication network 102.

User device 104 runs an application 106 over a network stack 108, sometimes called a protocol stack. Application 106 may interface with a user 105 of user device 104 and request that network stack 108 set up network connection 113 over network 102. Application 106 then sends data over network connection 113.

Network stack 108 is an implementation of a computer networking protocol suite. The computer networking protocol suite may include protocols having different layers of abstraction, such as specified in the OSI model. In embodiments, network stack 108 sets up a network connection for the application data. Network stack 108 may be a TCP/IP network stack that establishes a connection over network 102 using Transport Control Protocol (TCP)/Internet Protocol (IP) at the transport and network layers. Below the transport and network layers, network stack 108 may also implement data link and physical layer protocols, such as those specified by the Ethernet standards. After receiving application data from application 106, the application data may traverse through network stack 108 layers, partitioning the application data into smaller units, such as packets, and encapsulating the data encapsulating the units with any necessary header information. After traversing through its layers, network stack 108 transmits packets over connection 113.

In embodiments, when user 105 requires a specific functionality for the network connection, it informs library 110. Library 110 may be embedded in network stack 108. User 105 may use a separate application, such as an administrative application, to inform library 110 of the functional requirement for network connection 113.

In addition to using a separate, administrative application, user 105 communicates with library 110 through network stack 108. In other embodiments, user 105 may communicate with library 110 directly through an application by making a particular system call. In this way, either through a separate, administrative application or through a direct system call by application 106, library 110 learns of a new requirement for connection 113.

When library learns of the new requirement, library 110 may generate the control packet for configuring the network to provide the requirement for network connection 113. In embodiments, library 110 instructs network stack 108 to generate the control packet for configuring the network. Network stack 108 may send the control packet in a TCP or UDP format, or in an Ethernet format to forwarding device 112.

On receipt of the control packet, forwarding device 112 forwards it onto functionality module 116. Functionality module 116 instructs network controller 118, using the information in the control packet, to configure network 102 to provide the functionality requirement for network connection 113. In this way, the library local to, integrated with, and perhaps included within the network protocol stack configures the network to provide the requirement. An example operation is illustrated in greater detail with respect to FIGS. 2-3.

Figure 2:
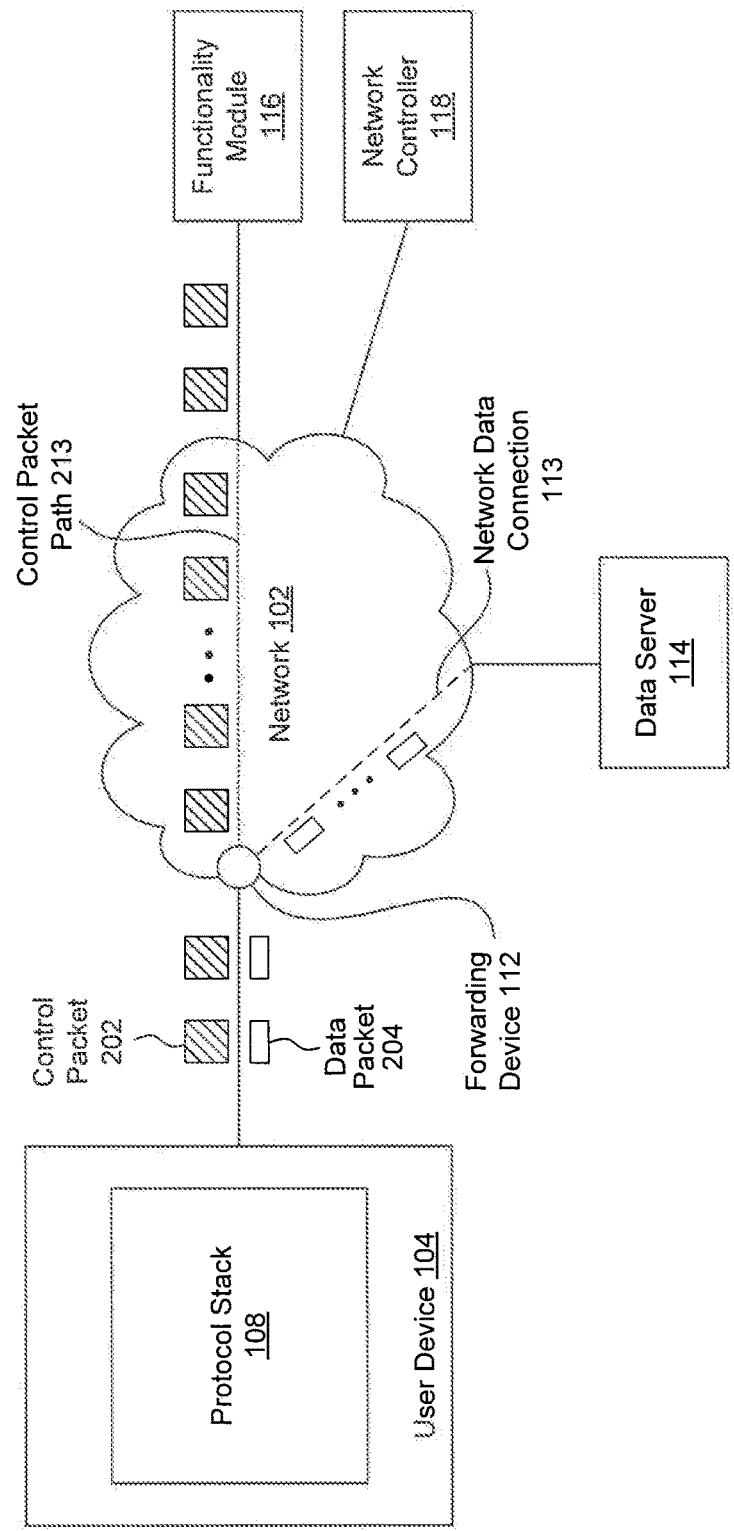
FIG. 2 is a diagram that illustrates an example of sending control and data packets from a user.

FIG. 2 is a diagram 200 illustrating an example operation where a control packet is sent from user device 104 to functionality module 116, according to an embodiment. Network stack 108 in user device 104 may generate control packet 202 and send it to forwarding device 112. According to an embodiment, user protocol stack 108 may send one control packet 202 to forwarding device 112. According to another embodiment, protocol stack 108 may periodically send control packets, updating the functionality module with any new requirements. When forwarding device 112 receives control packet 202, it forwards it to functionality module 116. In an embodiment, forwarding device 112 detects the control packet from the destination address on the control packet. In another embodiment, forwarding device 112 detects control packet from an identifier uniquely identifying the control packet. The identifier may be a packet header, for example.

When forwarding device 112 receives control packet 202, forwarding device 112 forwards it to functionality module 116 over a control packet path 213. In one embodiment, forwarding device 112 may establish control packet path 213 when it receives control packet 202. In another embodiment, control packet path 213 may be predetermined before forwarding device 112 receives a control packet.

In addition to transmitting control packet 202, network stack 108 also transmits a data packet 204 to forwarding device 112. Forwarding device 112 forwards data packet 204 on network data connection 113 to packet 204's destination, which in this example is data server 114.

Network stack 108 may transmit a data stream on network data connection 113. A data stream may be one or more packets in time proximity with one another having a common (1) protocol, (2) source/destination Internet Protocol (IP) addresses, and (3) source/destination TCP or UDP ports.

Figure 3:
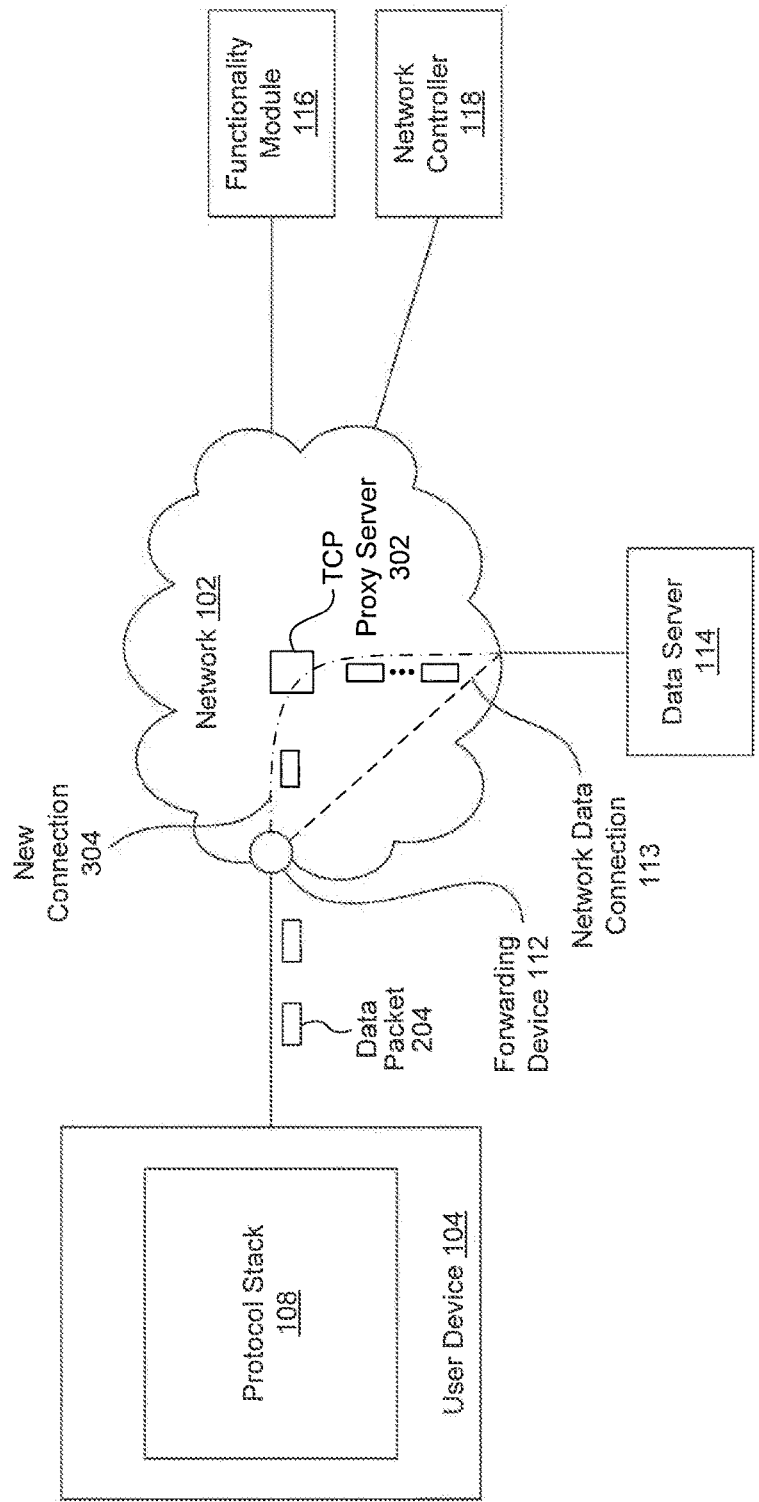
FIG. 3 is a diagram that illustrates an example of providing a network functionality for a network connection.

Once functionality module 116 receives control packet 202, its configures connection 113 to provide the requested functionality as illustrated, for example in FIG. 3.

FIG. 3 is a diagram 300 illustrating configuration of a network to provide the requested functionality. After functionality module 116 receives control packet 202, functionality module 116 uses the information indicating functionality requirement for connection 113 and instructs network controller 118 to configure the network. Network controller 118 configures the network to provide the functionality requirement for connection 113.

In the example embodiment shown in FIG. 3, network functionality requirement for connection 113 is providing TCP proxy for the connection. In this example network controller 118 configures network 102 such that data using network data connection 113 is re-routed on a new connection 304. Data packets on new connection 304 pass through a TCP proxy server 302. This way TCP proxy functionality requirement as indicated in control packet 202 is provided for connection 113.

Network controller 118 may reroute data on new connection 304 by, for example, determining a path from forwarding device 112 to data server 114 such that the determined path traverses TCP proxy server 302. Network controller may then configure forwarding device 112 and other forwarding devices on the determined path to route the application 106 data on the determined path to server 114. In another example, network controller 118 may encapsulate the data packets from user device 104 in new packets with the address of the TCP proxy server. TCP proxy server may then send the data to data server 114.

Network controller 118 may also send configuring messages to TCP proxy server 302. This way network controller 118 may configure TCP proxy server 302 to provide any particular functionality requirements for connection 113. The configuring messages may also inform TCP proxy server 302 of the destination address of the data packets. Using the destination address, TCP proxy server 302 can forward the data to its destination.

Another functionality requirement example may be dynamic service level. Dynamically changing service level of a connection may occur on forwarding device 112. In an embodiment, the service level is the capacity of connection 113. To provide dynamic capacity on connection 113, network controller 118 may send a message to configure forwarding device 112 to dynamically adjust the capacity assigned to connection 113. In an embodiment, network controller may send messages to configure all the forwarding devices connection 113 uses, to provide the required dynamic capacity.

In an embodiment, forwarding device 112 may include the functionality module 116. In the embodiment, forwarding device 112 after receiving the control packet, instructs network controller 118 to configure the network to provide the functionality requirements for connection 113.

Figure 4:
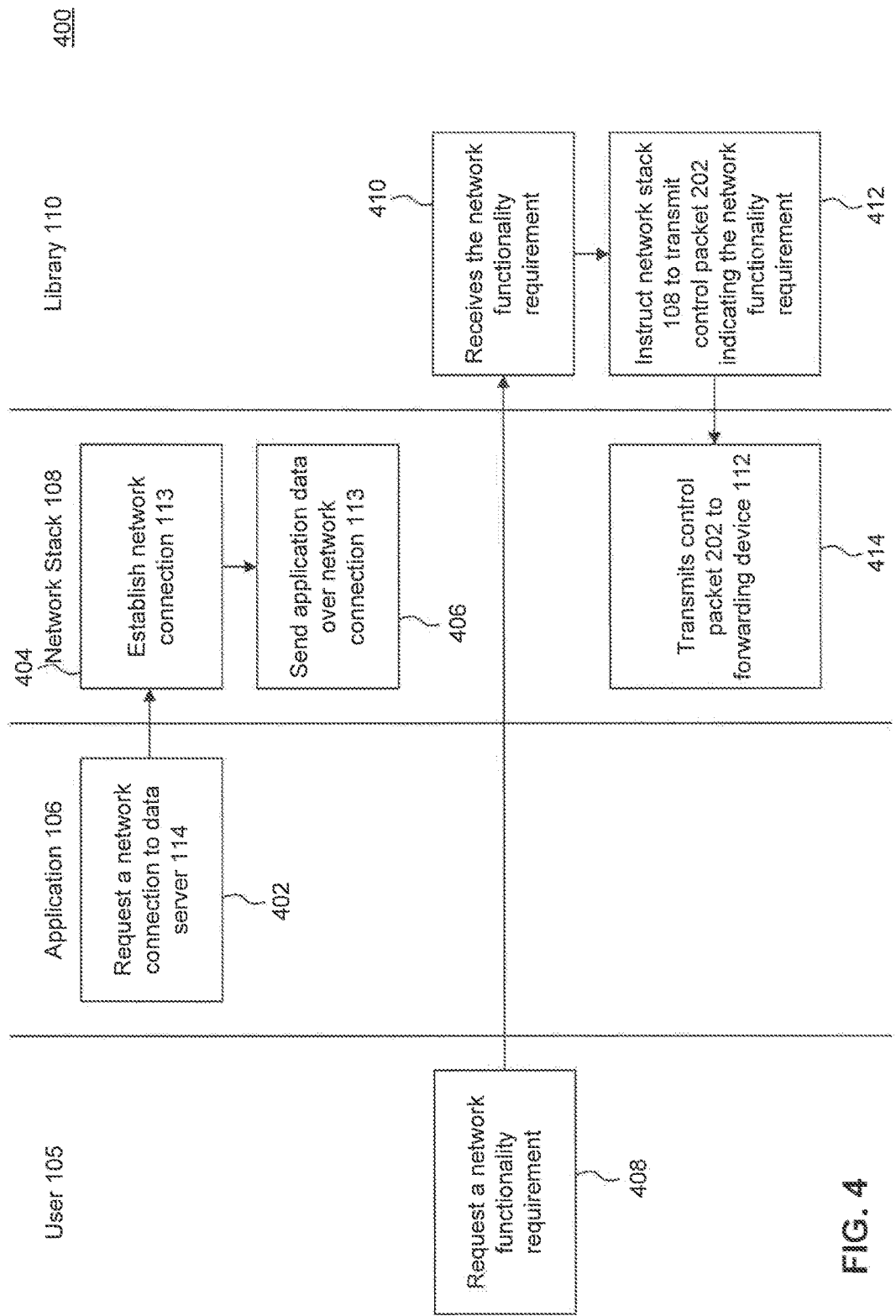
FIG. 4 is a flowchart that illustrates a method for requesting a network functionality for a network connection.

Method for Providing Functionality Requirement for a Network Connection Using Control Packet FIG. 4 is a diagram that illustrates a method 400 for requesting a network functionality for a network connection. Method 400 is described with respect to the example embodiments in FIGS. 1-3.

In an embodiment, at step 402, application 106 requests a network connection to data server 114. Network stack 108 receives the request for establishing the network connection. Network stack 108, at step 404, establishes network connection 113. At step 406, network stack 108 sends the application data over network connection 113. In some embodiments, network stack 108 may establish network connection 113 using TCP/IP or Ethernet protocol. Network stack 108 may send the application data over network connection 113 using transmission protocols such as TCP, UDP, MPLS, ATM, or Ethernet.

At step 408 user 105 requests a network functionality requirement for network connection 113. User 105 may send the request to library 110 using a specific application for requesting functionality requirement. In another embodiment, instead of the user, application 106 may send the functionality requirement for the connection that the application is using to transmit data.

In an embodiment, library 110 receives user's network functionality requirement at step 410. At step 412, library 110 instructs network stack 108 to transmit a control packet indicating the network functionality requirement. In an embodiment, library 110 may generate the control packet. In another embodiment, network stack 108 generates the control packet in response to the instruction from library 110.

The control packet may be sent while application data using network connection 113 is being transmitted. The control packet may be sent using protocols such as TCP, UDP, MPLS, ATM, or Ethernet.

Network stack 108, at step 414, transmits the control packet to forwarding device 112. Network stack 108 may transmit the control packet while transmitting the application 106 data. In an embodiment, forwarding device 112 is on the edge of a wide area network (WAN) and connects to user device 104 over a Local Area Network (LAN).

Figure 5:
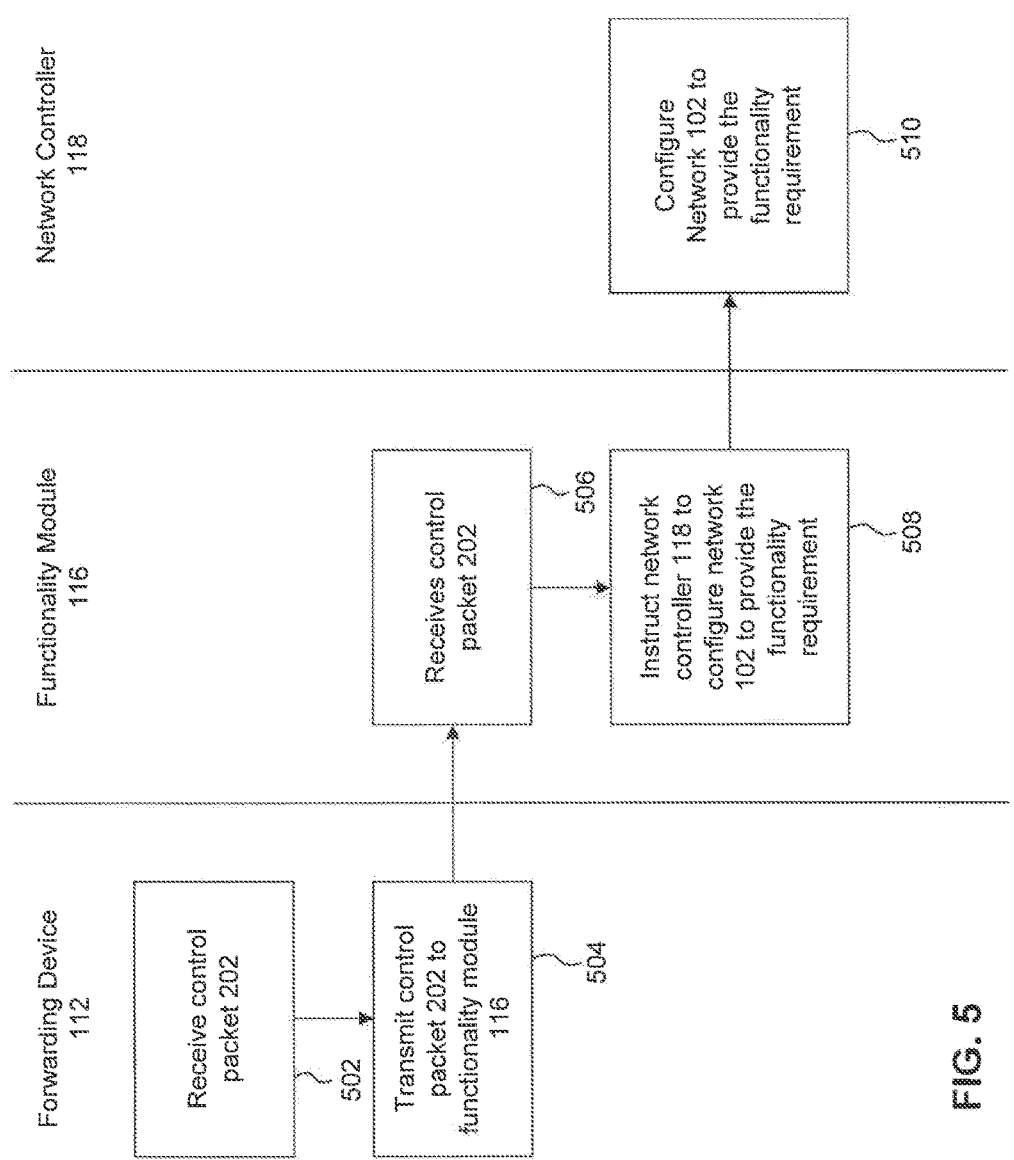
FIG. 5 is a flowchart that illustrates a method for configuring a network to provide a functionality for a network connection.

FIG. 5 is a flowchart that illustrates a method 500 for configuring a network to provide a functionality for a network connection. Method 500 is described with respect to the example embodiments in FIGS. 1-3.

In an embodiment, forwarding device 112 receives the control packet at step 502. In an embodiment, forwarding device 112 automatically detects the control packet and adds the destination address of functionality module 116 to the control packet. In another embodiment, the control packet includes functionality module 116's address as its destination when it is received, by forwarding device 112.

Forwarding device 112 may also add authentication information to the control packet. Authentication information can help other forwarding devices in network 102 and functionality module 116 to verify authentication of the control packet. At step 504, forwarding device 112 transmits the control packet to functionality module 116.

Functionality module 116 receives the control packet at step 506. After receiving the control packet, functionality module 116 may extract from the control packet the information indicating the functionality requirement for network connection 113. At step 508, functionality module 116 instructs network controller 118 to configure network 102 to provide the functionality requirement for network connection 113. In an embodiment, functionality module 116 may instruct network controller 118 through an API. Alternatively, functionality module 116 may instruct network controller 118 by transmitting instructing messages over network 102, or over a direct connection between the functionality module and the network controller.

At step 510, the network controller configures network 102 to provide the functionality requirement for network connection 113. For example, network controller 118 may configure network 102 to provide dynamic service level or to re-route to an intermediate processing server, such as a TCP proxy server.

To provide dynamic service level for a network connection, some embodiments dynamically change the service level according to real-time usage of the network connection. In these embodiments, the user may set up a business rule that specifies how to change a service level given a particular usage level. For example, a user may set up a business mite that states that allocated bandwidth should be doubled when the bandwidth utilized exceeds a particular threshold.

A plurality of these rules may be determined based on the Service Level Agreement (SLA) between a network service provider and the user. For example, by dynamically changing capacity or bandwidth allocation, users can easily augment their network capacity to meet the fluctuating demand of their applications. Embodiments dynamically update the service level of network connection, based on either a pre-defined schedule or usage.

Changes in the utilization and adjusting the service level, for example the capacity, may also be performed for each flow on a connection, rather than for the aggregated flows in a connection. In other words, the dynamic service level methods described herein may be applied to individual flows of traffic. For example, embodiments can provide dynamic service level to web (http) traffic, which can be one slice of the whole traffic on a given connection.

Flow level dynamic service level management allows the user to treat different flows or different types of traffic in different ways. In other words, it enables the user to use a class of service for different traffic types. For example, if a user wants to guarantee a certain service level for the voice traffic, it can dynamically change the service level assigned to voice traffic so that regardless of the aggregated traffic load on a connection, each flow of voice traffic enjoys a guaranteed service level.

An SLA may provide different guarantees for different classes of service. For example, streaming video may require a great deal of capacity, but latency may be relatively unimportant. Yet, voice-over-IP data may require relatively little capacity, but latency may be very important. The SLA can be decomposed into different classes of service and service level guarantees and a rule can be generated for each.

Figure 6:
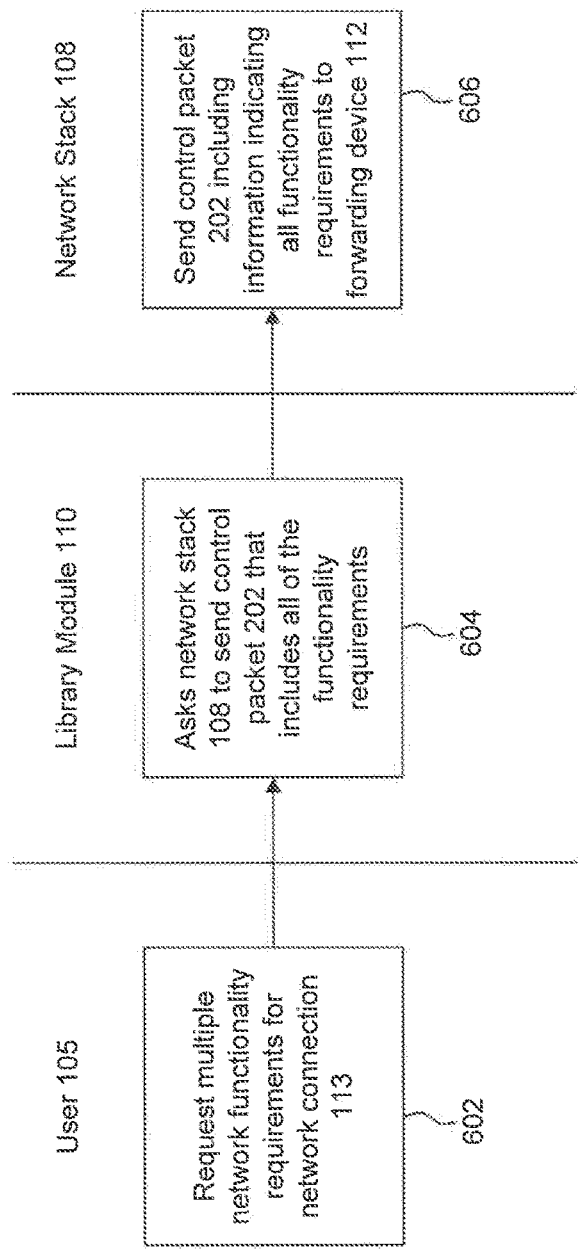
FIG. 6 is a flowchart that illustrates a method for requesting a network functionality for a network connection.

FIG. 6 is a flowchart that illustrates a method 600 for requesting a network functionality for a network connection. Method 600 is described with respect to the example embodiments in FIGS. 1-3.

In an embodiment, user 105, at step 602, requests multiple network functionality requirements for network connection 113. For example, user 105 may send multiple requirements for network connection 113 that application 106 is using to transmit data. In another embodiment, multiple applications may be running on network stack 108, each having different requirements for network connection 113 they use. User 105 may send requirements of all of the applications to library 110.

In an embodiment, user 105 may send all the network connection functionality requirements directly to the library 110. In another embodiment, different applications running on network stack 108, will send any network connection functionality requirements they have to library 110.

At step 604, library 110 may ask network stack 108 to send control packet 202 that includes information indicating all the network functionality requirements by the user. For example, library 110, when asking network stack 108 to generate control packet 202, may aggregate all the requirements of one application, or all the requirements of different applications. In an embodiment, library 110 generates control packet 202 that includes the aggregate information of all the requirements for network connection.

Network stack 108 at step 606 sends control packet 202 that includes information indicating all functionality requirements, to forwarding device 112. Forwarding device 112 forwards the control packet to the network functionality module or the network controller to configure the network accordingly.

Periodically Resending the Control Packet

Figure 7:
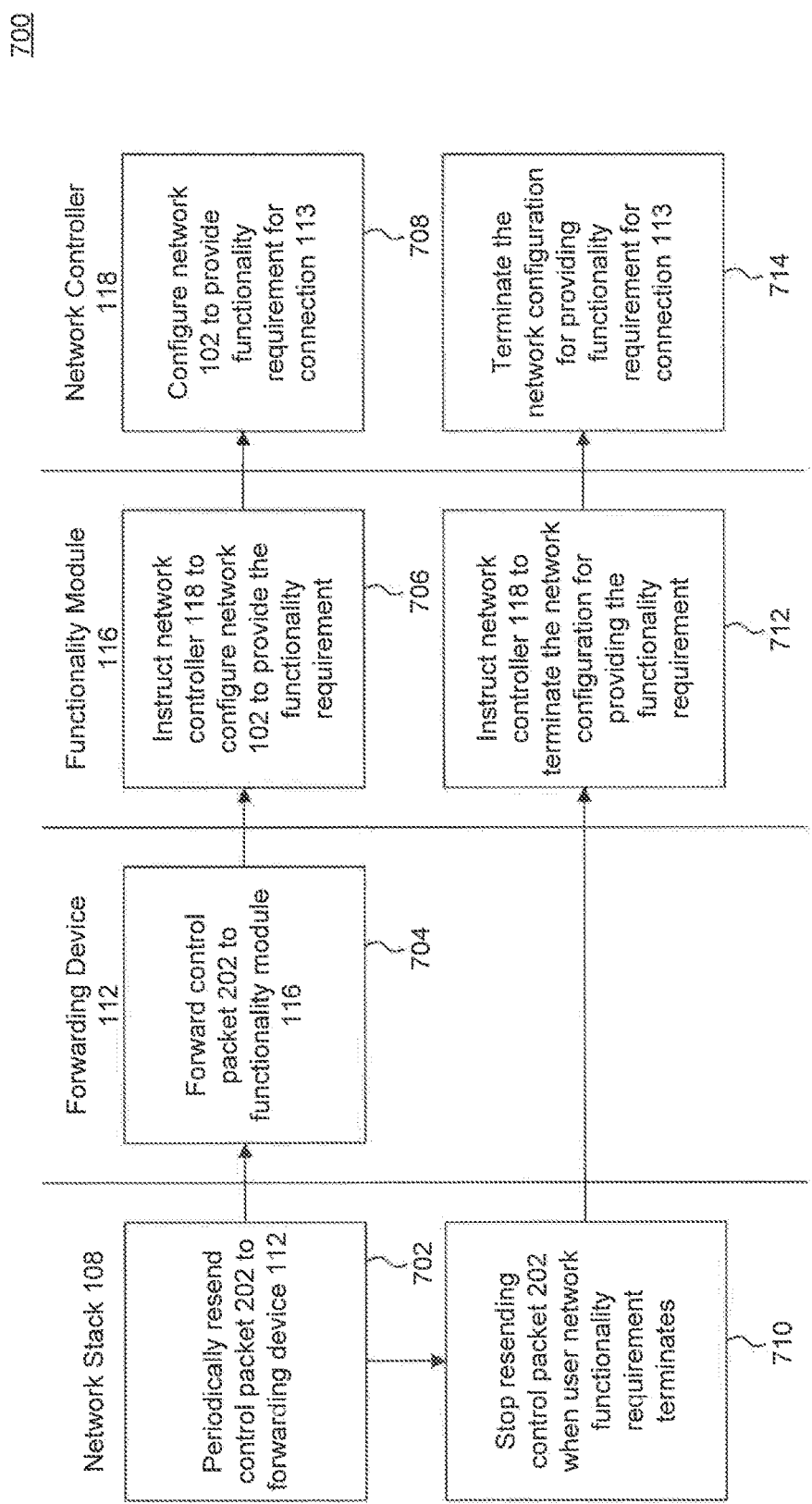
FIG. 7 is a flowchart that illustrates a method for requesting a network functionality for a network connection.

FIG. 7 is a flowchart that illustrates a method 700 for requesting a network functionality for a network connection. Method 700 is described with respect to the example embodiments in FIGS. 1-3.

In an embodiment, network stack 108, at step 702, periodically resends control packet 202 to forwarding device 112. At step 704, forwarding device 112 forwards control packet 202 to functionality module 116.

At step 706, functionality module 116 instructs network controller 118 to configure the network to provide the functionality requirement for the network connection. At step 708, network controller 118 configures the network 102 to provide the functionality requirement for the network connection.

When the network functionality for the connection is no longer required, network stack 108 may stop resending control packet 202 at step 710. When functionality module 116 does not receive control packet for a period of time, at step 712, it instructs network controller 118 to terminate the network configuration for providing the functionality requirement for network connection 113. Network controller 118, at step 714, terminates the network configuration for providing functionality requirement for connection 113.

Conclusion

The term "user," as used herein, may encompass both a customer of the network connectivity service, such as an employee of a business that utilizes the network connectivity service, and a network administrator of the service provider itself. Users may also be at different companies or organizations.

Each of the servers and modules in FIG. 1 may be implemented in hardware, software, firmware, or any combination thereof.

Each of the servers and modules in FIG. 1 may be implemented on the same or different computing devices. Such computing devices can include, but are not limited to, a personal computer, a mobile device such as a mobile phone, workstation, embedded system, game console, television, set-top box, or any other computing device. Further, a computing device can include, but is not limited to, a device having a processor and memory, including a non-transitory memory, for executing and storing instructions. The memory may tangibly embody the data and program instructions. Software may include one or more applications and an operating system. Hardware can include, but is not limited to, a processor, a memory, and a graphical user interface display. The computing device may also have multiple processors and multiple shared or separate memory components. For example, the computing device may be a part of or the entirety of a clustered or distributed computing environment or server farm.

Identifiers, such as "(a)," "(b)," "(i)," "(ii)," etc., are sometimes used for different elements or steps. These identifiers are used for clarity and do not necessarily designate an order for the elements or steps.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for transmitting data packets associated with an application to a data server over a network, the method comprising:
    transmitting the data packets to the data server over a network connection, the network connection including a first plurality of devices in the network that the data packets traverse to reach the data server, wherein a network stack initiates the network connection in response to a request by the application;
    receiving, at a library integrated with the network stack, a functionality requirement for the network connection; and
    in response to receipt of the functionality requirement, instructing the network stack to transmit a control packet that indicates the functionality requirement and instructs a network controller to configure the network to provide the functionality requirement by determining a second network connection, the second network connection comprising a second plurality of devices in the network and a service provider that serves the functionality requirement, wherein the data packets traverse the second network connection to reach the data server.

2. The method of claim 1, further comprising:
    transmitting the control packet to a forwarding device in the network, wherein the forwarding device adds authentication information to the control packet and receives the transmitted data packets for sending to the data server over the network connection.

3. The method of claim 2, wherein the control packet is transmitted while the data packets are transmitted.

4. The method of claim 2, further comprising:
    adding an address of a functionality module to the control packet, wherein the functionality module is connected to the network; and
    forwarding the control packet with authentication information to the functionality module, wherein the functionality module instructs the network controller to configure the network, based on the control packet, to determine the second network connection.

5. The method of claim 1, further comprising:
    receiving, by a functionality module in a forwarding device, the control packet;
    instructing, by the functionality module using the control packet, the network controller to determine the second network connection to provide the functionality requirement.

6. The method of claim 1, wherein the functionality requirement is received through another application being operated by a user.

7. The method of claim 1, wherein the functionality requirement is received from a user before the application begins transmitting the data packets over the network connection.

8. The method of claim 1, wherein the functionality requirement is received through another application being operated by a user while the data packets are being transmitted over the network connection.

9. The method of claim 1, further comprising:
    receiving, by the library, a second functionality requirement for the network connection; and
    in response to receiving the second functionality requirement, transmitting another control packet, such that the another control packet indicates the functionality requirement and the second functionality requirement for the network connection.

10. The method of claim 1, further comprising:
    receiving, by the library and from a second application using the network connection, a second functionality requirement for the network connection; and
    transmitting another control packet that indicates the functionality requirement and the second functionality requirements for the network connection and instructs the network to provide both.

11. The method of claim 1, further comprising:
    periodically retransmitting the control packet until receipt of a termination request from the application for terminating the network functionality, wherein when no control packet is transmitted for a time period, the network controller reconfigures the network to no longer provide the functionality requirement.

12. A system for transmitting data packets associated with an application, from a user device configured to run the application using a network stack, over a network connection to a data server, the system comprising:
    a library module, implemented on a first computing device, configured to:
        receive a functionality requirement for the network connection that the network stack initiated in response to a request by the application, wherein the network connection comprises a first plurality of devices in a network that the data packets traverse to reach the data server;
        in response to receipt of the functionality requirement, notify the network stack to transmit a control packet that indicates the functionality requirement;
    a second computing device connected to the first computing device via the network; and
    a functionality module, implemented on the second computing device, configured to, based on the control packet, instruct a network controller to configure the network to provide the functionality requirement by determining a second network connection, the second network connection comprising a second plurality of devices in the network and a service provider that serves the functionality requirement, wherein the data packets traverse the second network connection to reach the data server.

13. The system of claim 12, wherein the network stack is further configured to transmit the control packet while transmitting the data packets.

14. The system of claim 12 further comprising a forwarding device configured to:
    receive the control packet;
    receive the data packets transmitted from the application for sending over the network connection; and
    add authentication information to the control packet.

15. The system of claim 14, wherein the forwarding device is further configured to:
- forward the control packet with authentication information to the functionality module connected to the network; and
- add an address of the functionality module to the control packet.

16. The system of claim 15, wherein the forwarding device is located at an edge of the network and is connected to the user device on a local area network.

17. The system of claim 12, further comprising a forwarding device configured to receive the control packet, wherein the forwarding device comprises a second functionality module configured to, using the control packet, instruct the network controller to configure the network to provide the functionality requirement for the network connection.

18. The system of claim 12, wherein the library module is further configured to:
- receive, from a second application using the network connection, another functionality requirement for the network connection;
- in response to receiving the second functionality requirement, notify the network stack to transmit another control packet that indicates the functionality requirement and the another functionality requirement for the network connection and instructs the network controller to reconfigure the network to provide the functionality requirement and the another functionality requirement.

19. The system of claim 12, wherein:
the library module is further configured to:
- notify the network stack to periodically retransmit the control packet until receipt of a termination request from the application for terminating the network functionality;

the functionality module further configured to:
- when no control packet retransmission is received for a time period, instruct the network controller to reconfigure the network to no longer provide the functionality requirement.

20. The system of claim 12, wherein the network is a private service provider network and the data server is connected to the network through another public network.

21. A program storage device tangibly embodying a program of instructions executable by at least one machine to perform a method for transmitting data packets associated with an application to a data server over a network, the method comprising:
- transmitting the data packets to the data server over a network connection, the network connection including a first plurality of devices in the network that the data packets traverse to reach the data server, wherein the network connection is initiated by a network stack in response to a request by the application;
- receiving at a library integrated with a network stack, a functionality requirement for a network connection; and
- in response to receiving the functionality requirement, transmitting a control packet, wherein the control packet indicates the functionality requirement of the application and instructs a network controller module to configure the network to provide the functionality requirement by determining a second network connection, the second network connection comprising a second plurality of devices in the network and a service provider that serves the functionality requirement, wherein the data packets traverse the second network connection to reach the data server.

22. A computer implemented method for transmitting data packets associated with an application over a network, the method comprising:
- transmitting the data packets to a data server via a network connection, wherein the network connection comprises a first plurality of devices in the network;
- receiving, at a library integrated with a network stack, a functionality requirement for the network connection that the network stack initiated in response to a request by the application; and
- in response to receipt of the functionality requirement, transmitting, from the library, a control packet that indicates the functionality requirement and instructs a functionality module to create a second route, the second route comprising a second plurality of devices and a service provider that serves the functionality requirement, wherein the data packets traverse the second route to the data server.

* * * * *